Nov. 3, 1964  C. E. BRICKER  3,155,199
SPRING APPLIED BRAKE

Filed Oct. 11, 1963  2 Sheets-Sheet 1

INVENTOR.
CARL E. BRICKER
BY
*J. B. Holden*
ATTORNEY

INVENTOR
CARL E. BRICKER
BY
J.B. Holden
ATTORNEY

United States Patent Office 3,155,199
Patented Nov. 3, 1964

3,155,199
SPRING APPLIED BRAKE
Carl E. Bricker, Cuyahoga Falls, Ohio, assignor to The Goodyear Tire & Rubber Company, Akron, Ohio, a corporation of Ohio
Filed Oct. 11, 1963, Ser. No. 315,534
8 Claims. (Cl. 188—170)

This invention relates to a spring applied brake, and more particularly to a compact brake unit which has particular application to all types of fail-safe braking operational uses.

Heretofore it has been known that there are many and varied types of fail-safe brakes. These brakes are used on equipment such as elevators, winches, telescope drive mechanisms, and various other equipment of this type. Normally, these brakes are not applied unless there is a power failure or stoppage of the drive means to the equipment. It is in this "fail" condition that brakes of this type are actuated to hold the failed equipment in position until the failure has been remedied. It has been known that compression coil or Belleville type springs have been utilized in fail-safe brakes. However, these brakes are characterized by being quite large, expensive, and not adaptable to smaller, more precise mechanisms wherein a high braking force for a small unit/weight area is necessary.

It is the general object of the invention to avoid and overcome the foregoing objections to prior art practices by the provisions of a small and compact unit utilizing "U-shaped" springs to apply a large braking pressure per unit area and per unit weight in fail-safe braking operations.

A further object of the invention is to provide a fail-safe brake unit which is spring mounted in a frame work to suitably transfer the braking force and permit movement at right angles to the braking force to compensate for any change in the moving structure to be braked.

Another object of the invention is to provide a fail-safe type brake which provides a very high braking force for very small compact unit, and which unit is rugged, highly effective, and very low in cost.

A further object of the invention is to provide a fail-safe type brake unit which utilizes a plurality of U-shaped springs held apart by hydraulic pressure through a toggle-type linkage and which springs engage the movable structure to be braked with opposed frictional surfaces when the hydraulic pressure is released.

The aforesaid objects of the invention and other objects which will become apparent as the description proceeds are achieved by providing in a brake the combination of a frame, a plurality of U-shaped spring means pivotally mounted together as one unit in centered relation to the frame and adapted to pivot transversely in relation to the frame, friction pads operatively affixed in opposed relation to the opened ends of the U-shaped spring means, toggle linkage means operatively mounted within the spring means and affixed to the opposed sides of the spring means to adjust the width of the opening to the U-shaped portion of the spring means, and a movable member to be braked adapted to be operatively engaged in opposed relation by the friction pads.

For a better understanding of the invention, reference should be had to the accompanying drawings, wherein.

While it is to be understood that the invention could be used in outwardly clamping against a member to be braked, the invention is usually used in clamping a member to be braked between the opened U-shaped ends of the spring means, and hence it has been so illustrated and will be so described.

Figure 1:
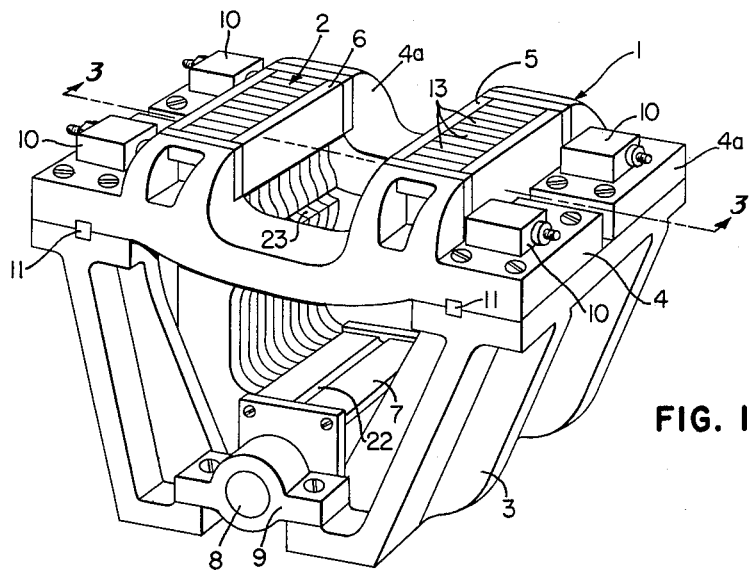
FIGURE 1 is a perspective view of the brake unit comprising the invention with the movable member to be braked not shown.

With reference to FIGURE 1 of the drawings, the numeral 1 indicates generally a brake unit employing the embodiments of the invention, which comprises a plurality of U-shaped springs, indicated generally by numeral 2, which are pivotally mounted within a substantially U-shaped lower frame work 3 and upper frame work sections 4 and 4a. The springs 2 are held together as an integral unit by end housings 5 and 6, respectively and a central housing clamp 7. The central housing clamp 7 contains an integral journal 8 on each end thereof which is received in a journal housing 9 to complete the pivotal mounting of the springs 2. The upper framework sections 4 and 4a abut the end housings 5 holding the springs together and limit the longitudinal movement of the springs 4. It should be understood that the springs 2 can pivot about journals 8. The springs 2 may be properly centered in relation to the upper framework sections 4 and 4a by means of centering springs 10. In order to properly position the upper frame sections 4 and 4a in relation to the lower framework 3, keys 11 may be provided.

Figure 2:
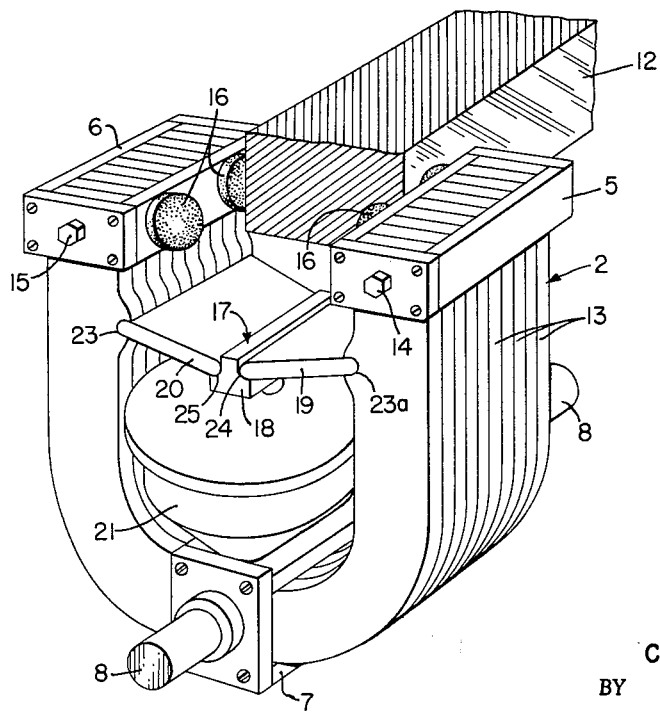
FIGURE 2 is a perspective view of the U-shaped spring means of the brake unit of FIGURE 1 showing the friction pads and relation to the movable member to be braked.

With reference to FIGURE 2, the springs 2 are shown separately from the framework 3, 4, and 4a with a movable member 12 passing through the end of the springs 2. FIGURE 2 clearly illustrates that the springs 2 are made up of a plurality of individually U-shaped spring members 13 which are held together as one unit at the top by the end housings 5 and 6, respectively, and at the bottom by the central housing clamp 7. Normally, these housings are held together by convenient means such as bolts to clamp the spring members 13 in place after the spring members 13 have been properly arranged. The invention further contemplates that bolts 14 and 15, respectively, pass through the width of all the springs 13 clamped together to further insure proper positioning by the end housings 5 and 6.

In order to provide the frictional force necessary in the brake unit 1, a plurality of circular button shaped friction pads 16 are operatively affixed in opposed relation to the inner sides of end housings 5 and 6, respectively. The invention contemplates that the friction pads 16 are removably affixed to housings 5 and 6 by convenient means to permit renewal as the pads 16 are worn. The location of the friction pads 16 is such that they will substantially fully engage the movable member 12 as the opened end of the spring 2 closes around the movable member 12.

The designed concept of the apparatus contemplates that the series of U-shaped spring members 2 will normally have their opened ends closed to a width substantially less than the width of movable member 12 so that they must be forced outwardly to permit movable member 12 to pass freely therebetween. In order to achieve this design, a toggle linkage, indicated generally by numeral 17, comprising a central base member 18, and two side links 19 and 20, respectively, is provided. The base member 18 is operatively attached to a hydraulic cylinder pressure means 21, which pressure means 21 is operatively pivotally mounted to a groove 22 in the central housing clamp 7. The groove 22 is best seen in FIGURE 1. The side links 19 and 20 are removably received in recessed portions 22 and 23, respectively, on the inside of spring members 13. The inner end of side links 19 and 20 are received in recesses 24 and 25, respectively, in base member 18. During operational use of the brake unit 1, as movable member 12 is moving relative thereto, the hydraulic cylinder pressure means 21 is actuated causing base member 18 to move vertically upwardly forcing side links 19 and 20 to force the upper ends of the brake members 13 outwardly allowing movable member 12 to pass freely therethrough. If and when a failure occurs in the system, the pressure to hydraulic cylinder pressure means 21 will be released causing base member 18 to move vertically downwardly allowing the spring force in spring members 13 to move together and clamp the friction pads 16 against opposite sides of movable member 12. Thus, the fail-safe feature of the brake unit is achieved.

Figure 3:
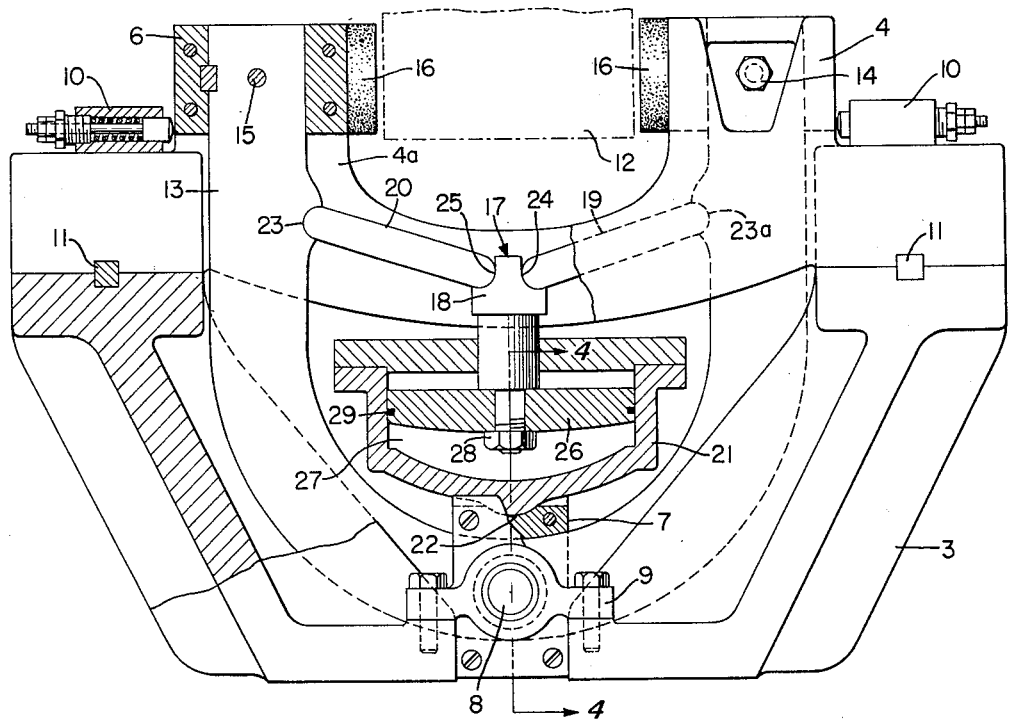
FIGURE 3 is a cross sectional front elevational view of the brake unit taken substantially on the line 3—3 of FIGURE 1.

With reference to FIGURE 3 it should be noted that the hydraulic cylinder pressure means 21 comprises a piston 26 slidably received in a cylinder 27 with the base member 18 operatively affixed to the piston 26 by means of nut 28. Suitable means (not shown) may be provided to introduce pressure beneath the piston 26. In the conventional manner an O ring 29 insures no leakage around the piston 26.

Figure 4:
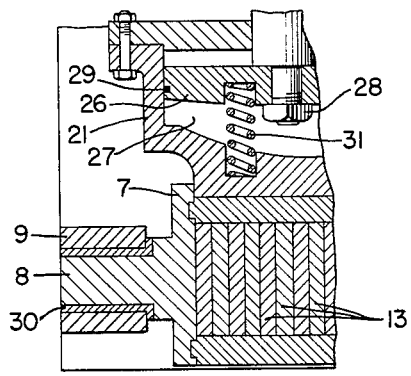
FIGURE 4 is a fragmentary cross sectional side elevation showing the pivotal mounting of the springs to the frame taken on line 4—4 of FIGURE 3.

FIGURE 4 illustrates in more detail the relationship of the journal 8 comprising a portion of the central housing clamp 7 and the journal housing 9. Note that a sleeve bearing 30 may be used between the journal 8 and the housing 9. Also, spring bias means such as a spring 31, may be used to help support piston 26 in the upward position in order to reduce the amount of fluid pressure necessary to hold the piston 26 in the proper upward position.

Further, the invention contemplates that the springs 2 may be mounted within the housings 3, 4, and 4a so as to be resilient in the lateral and vertical directions to adapt the basic compact brake unit to a variable situation such as where the brake unit is moved or the member to be braked might have slight displacement.

Thus, it is seen that the springs 2 are firmly supported in the direction of braking movement by the upper framework sections 4 and 4a. The springs 2 are pivotally mounted at a bottom centered portion by pin 8 received in housing 9. A toggle linkage operatively connected to piston 21 and springs 2 provides positive fail-safe action to the brake. A compact fail-safe brake unit has been illustrated and described, which unit is highly effective, durable, and which provides an extremely high braking force per unit area and per unit weight.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In a brake the combination of
   a movable member to be braked,
   U-shaped spring means operatively receiving the movable member in the U-shaped portion thereof, the U-shaped portion of the spring means having a normal width substantially less than the width of said movable member so that said spring means normally clamps onto said movable member,
   friction pad means operatively mounted to said spring means and adapted for opposed engagement with said movable member,
   toggle linkage means operatively engaging the open ends of said U-shaped spring means,
   pressure means operatively engaging said toggle linkage means to effect movement thereto to control the spread to the opened U-shaped portion of the spring means, and
   frame means operatively mounting and positioning the spring means in relation to the movable member.

2. In a brake the combination of
   a member to be braked,
   C-shaped spring means operatively receiving the movable member in the opening thereof, the opening of the spring means having a normal width substantially less than the width of said movable member,
   friction pad means operatively mounted to said spring means and adapted for opposed engagement with said movable member,
   toggle linkage means operatively engaging the spring means in opposed relation on each side of the opening thereto,
   pressure means operatively engaging said toggle linkage means to effect movement thereto to control the width of the opening of the spring means, and
   frame means to operatively mount and properly position the spring means in relation to the movable member.

3. In a brake the combination of
   a frame,
   a plurality of U-shaped spring means operatively mounted in pivotal relation to the frame,
   a plurality of friction pads operatively affixed in opposed relation to the opened ends of the U-shaped spring means,
   toggle linkage means operatively affixed to the spring means to widen the opening to the U-shaped spring means, and
   a movable member to be braked adapted to be operatively engaged by the friction pads when the toggle linkage releases the spring means to seek their normal openings.

4. In a brake the combination of
   a frame,
   a plurality of substantially semicircularly shaped spring means operatively mounted to the frame,
   a plurality of friction pads operatively affixed in opposed relation adjacent the opening of the spring means,
   toggle linkage means operatively affixed within the spring means and adapted to adjust the width of the opening of the spring means,
   pressure means to hold the toggle linkage means to fix the opening of the spring means in a widened position, and
   a movable member to be braked adapted to pass freely through the opening of the spring means when the pressure means hold the opening in a widened position, said movable member adapted to be operatively engaged in opposed relation by said friction pads when said pressure means is released.

5. In a brake the combination of
   a frame,
   a plurality of U-shaped spring means pivotally mounted together as one unit in substantially centered relation to the frame and adapted to pivot transversely in relation to the frame,
   friction pads operatively affixed in opposed relation adjacent the ends of the U-shaped spring means,
   a movable member to be braked operatively positioned between the ends of the spring means, and
   means operatively mounted within the spring means to hold the ends thereof in substantially wider than normal relation during energized movement of the movable member to allow free movement thereof, said means adapted to be released during non-energized movement of said movable member allowing the friction pads to operatively engage the movable member in opposed relation to effect a braking action thereon.

6. In a brake the combination of
   a frame,
   U-shaped spring means pivotally mounted in centered relation to the frame and adapted to pivot transversely in relation to the frame, friction pads operatively affixed in opposed relation to the ends of the U-shaped spring means, toggle linkage means operatively mounted within the spring means and affixed to the opposed sides of the spring means to adjust the width of the opening to the U-shaped portion of the spring means, and a movable member to be braked adapted to pass freely between the ends of the spring means when the opening is held by the toggle linkage means in a widened position, said movable member adapted to be operatively engaged in opposed relation by the friction pads when the toggle linkage means are released allowing the ends of the spring means to tend to return to a normal static position.

7. In a brake the combination of a U-shaped spring unit, a frame adapted to support the spring unit, said frame limiting the longitudinal movement of the entire spring unit and allowing unlimited transverse movement of the ends of the spring unit, means contained internal of the spring unit adapted to spread the ends thereof, a movable member adapted to pass freely between the spread ends of the spring unit, and friction pads mounted in opposed relation to the ends of the spring unit and adapted to engage the movable member when the ends of the spring unit are not spread.

8. In a brake the combination of a frame, a plurality of U-shaped spring means pivotally mounted together as one unit in substantially centered relation to the frame, said spring means adapted to pivot transversely in relation to the frame but restricted in longitudinal movement by the frame, said spring means adapted to receive a movable member to be braked between the opened U-shaped ends thereof, and means operatively mounted within the spring means to hold the ends thereof in substantially wider than normal relation during energized movement of the movable member to allow free movement thereof, said means adapted to be released during non-energized movement of said movable member allowing the spring means to operatively engage the movable member in opposed relation to effect the braking action thereon.

No references cited.